(12) United States Patent
Kikuchi et al.

(10) Patent No.: US 8,562,363 B2
(45) Date of Patent: Oct. 22, 2013

(54) CARD CONNECTOR

(75) Inventors: Kouji Kikuchi, Tokyo (JP); Yoshiharu Ishii, Yokohama (JP); Masaaki Ooya, Yokohama (JP)

(73) Assignee: Yamaichi Electronics Co. Ltd., Tokyo (JP)

( * ) Notice: Subject to any disclaimer, the term of this patent is extended or adjusted under 35 U.S.C. 154(b) by 164 days.

(21) Appl. No.: 13/149,101

(22) Filed: May 31, 2011

(65) Prior Publication Data

US 2011/0294322 A1 Dec. 1, 2011

(30) Foreign Application Priority Data

Jun. 1, 2010 (JP) ................................ 2010-125749

(51) Int. Cl.
*H01R 13/62* (2006.01)
(52) U.S. Cl.
USPC .......................................... 439/157; 439/630
(58) Field of Classification Search
USPC .................. 439/157–159, 630–632
See application file for complete search history.

(56) References Cited

U.S. PATENT DOCUMENTS

| | | | | |
|---|---|---|---|---|
| 5,921,787 | A * | 7/1999 | Pope et al. ........................ | 439/74 |
| 7,008,245 | B1 * | 3/2006 | Chien ............................. | 439/159 |
| 7,094,082 | B2 | 8/2006 | Ooya et al. | |
| 7,252,522 | B2 | 8/2007 | Ooya et al. | |
| 8,262,397 | B1 * | 9/2012 | Van der Steen ................ | 439/159 |
| 2001/0012712 | A1 * | 8/2001 | Nishioka ........................ | 439/159 |
| 2002/0119688 | A1 * | 8/2002 | Nishioka ........................ | 439/188 |
| 2002/0192991 | A1 * | 12/2002 | Motojima ....................... | 439/157 |
| 2004/0029446 | A1 * | 2/2004 | Ooya et al. ..................... | 439/630 |
| 2004/0092146 | A1 * | 5/2004 | Tien .............................. | 439/159 |
| 2006/0166533 | A1 * | 7/2006 | Muramatsu et al. .......... | 439/160 |
| 2009/0075507 | A1 * | 3/2009 | Chikashige et al. ........... | 439/159 |
| 2009/0093144 | A1 * | 4/2009 | Cheng ............................ | 439/79 |
| 2009/0160639 | A1 * | 6/2009 | Chu ........................... | 340/539.11 |
| 2011/0070759 | A1 * | 3/2011 | Matsumoto et al. ........... | 439/159 |

FOREIGN PATENT DOCUMENTS

| | | |
|---|---|---|
| JP | 10-172674 | 6/1998 |
| JP | 11-297419 | 10/1999 |
| JP | 2001-110518 | 4/2001 |
| JP | 2004-087480 | 3/2004 |
| JP | 2008-277194 | 11/2008 |
| JP | 2009-110884 | 5/2009 |

OTHER PUBLICATIONS

Office Action for corresponding Japanese Patent Application No. 2010-125749 dated May 1, 2012.

* cited by examiner

*Primary Examiner* — Truc Nguyen
(74) *Attorney, Agent, or Firm* — Banner & Witcoff, Ltd.

(57) ABSTRACT

A card connector with an ejection mechanism is described. The card connector may include a base member, a cover member, a card accommodating space, and contact lines, which are electrically connected to a card placed into the card accommodating space. The card connector may also include an ejection lever, a spring, which pushes the ejection lever to the card accommodating space, and a pair of guide walls, which lead the ejection lever in a card insertion/withdrawal direction. The card connector may further include an ejection mechanism for pulling the IC card out of the card accommodating space. The ejection lever may include an arm portion, which comes in contact with a front end portion of the card, a spring mounting portion, a slide portion, which is led to a pair of the guide walls, and a pull portion, which extends outside the base member.

14 Claims, 6 Drawing Sheets

CARD CONNECTOR

CROSS-REFERENCE TO RELATED APPLICATIONS

The application claims the benefits of Japanese Patent Application No. 2010-125749 filed Jun. 1, 2010 which is hereby incorporated by reference herein its entirely.

BACKGROUND OF THE INVENTION

1. Field of the Invention

The present invention relates to a card connector that is for example attached to a portable device or the like, and particularly to a card connector of a manual insertion type that is equipped with an ejection mechanism.

2. Description of the Related Art

In recent years, an integrated circuit card (also simply referred to as IC card or card, hereinafter) is increasingly used in an electronic device such as a personal computer, digital camera, recorder, cellular phone, portable audio device, or PDA (Personal Digital Assistance) and other various kinds of information terminal device. There are the following cards: a PC card, in which an IC component called IC chip that is used for storing, transmitting or processing information is embedded; a MMC (Multi Media Card) card; a SD (Secure Digital) card; a SIM (Subscriber Identity Module) card; or the like. There also may be a kind of card that functions as a hard disk such as a flash memory-type recording medium, for example.

Such a card is usually connected to a card connecter (also simply referred to as a connector, hereinafter) for use, which is mounted on a printed circuit board or the like of the device. As portable devices become more sophisticated, or gain more functions, and become smaller in size, it is increasingly required for connectors, particularly those to which small cards such as SIM cards or Micro SD cards are connected, to become smaller in size and have lower backs (or become thinner).

As the small-size cards and the connectors have become smaller in size and thinner in recent years, it becomes more difficult to eject the card connected to the connector, for example, at a time when the card or the like is replaced. Accordingly, a push-type connector is disclosed so that a card can be easily ejected from the connector (Referred to Japanese Patent Laid-Open No. 2004-87480, for example). A manual insertion connector is also proposed: The manual insertion connector includes a coil spring, with a simplified ejection mechanism for ejecting a card (Referred to Japanese Patent Laid-Open No. 2008-277194, for example).

However, the push-type connector requires a lock mechanism to keep the connected card from springing out from the connector. Therefore, the structure of the connector is complex and the components thereof increase in number, affecting production costs. The card ejection mechanism disclosed in Patent Document 2 is so formed that a manual-insertion pull portion of an ejection lever for inserting and withdrawing the card is inserted into a compression coil spring. Or alternatively, the card ejection mechanism is so formed that a slit is formed by making a hole in a central axis area of the ejection lever, and the compression coil spring is placed in the slit. In this case, there is a limit to making the ejection mechanism, as well as the connector having the ejection mechanism, smaller in size and thinner.

The present invention has been made in view of the above circumstances. The object of the present invention is to simplify the structure of an ejection mechanism that is able to eject an IC card from a card accommodating space and reduce the number of components thereof, as well as to lower costs of a card connector having the ejection mechanism and eliminate the limit to make the card connector smaller and thinner.

SUMMARY OF THE INVENTION

To achieve the above object, a card connector of one embodiment of the invention includes: a base member having an insertion port of an IC card, the IC card inserted from the insertion port in a card insertion/withdrawal direction, and defining a card accommodating space for housing the IC card, a cover member assembled on the base member, and a plurality of contacts arranged on the base member to be electrically connected to the IC card housed in the card accommodating space;

the card connector comprising an ejection mechanism including a metallic ejection lever, a compression coil spring keeping the metallic ejection lever in the card accommodating space, and a guide member leading the metallic ejection lever in the card insertion/withdrawal direction, the ejection mechanism being used to pull the IC card housed in the card accommodating space out of the card accommodating space, and the metallic ejection lever including an arm portion inclined from the card insertion/withdrawal direction for coming in contact with the IC card, a coil mounting portion on which the compression coil spring is mounted, a slide portion sliding in the guide member, and an pull portion extending outside the base member.

According to the embodiment of the present invention, the structure of the ejection mechanism of the connector becomes simple; the strength of the ejection mechanism is maintained even if the ejection mechanism is made smaller in size. Moreover, a manual insertion operation becomes easier; it is also possible to make the connector even smaller in size. Furthermore, the components of the ejection mechanism decrease in number; it is possible to easily lower costs of the connector.

BRIEF DESCRIPTION OF THE INVENTION

DESCRIPTION OF THE EMBODIMENTS

The following describes several preferred embodiments of the present invention with reference to the accompanying drawings. Here, portions that are the same as, or similar to, each other are indicated by the same reference symbols; overlapping descriptions will be partially omitted. Incidentally, in the present application, words "front" and "rear" indicate a +x-direction and −x-direction, respectively, which are shown in the figures. Similarly, words "left" and "right" indicate a +y-direction and −y-direction, respectively, which are shown in the figures. Words "up" and "down" indicate a +z-direction and −z-direction, respectively. That is, an insertion/withdrawal direction of an IC card for a connector serves as a basis and is recognized as an x-direction. The insertion direction of a card front end portion is a forward direction, i.e. +x-direction; the withdrawal direction of a card rear end portion is a backward direction, i.e. −x-direction. Accordingly, an inner wall of a card connector is defined as a front wall 11c. A front end of a card accommodating space 13 is defined as a front wall side, and a rear end as a card insertion/withdrawal opening side.

(First Embodiment)

Figure 1:
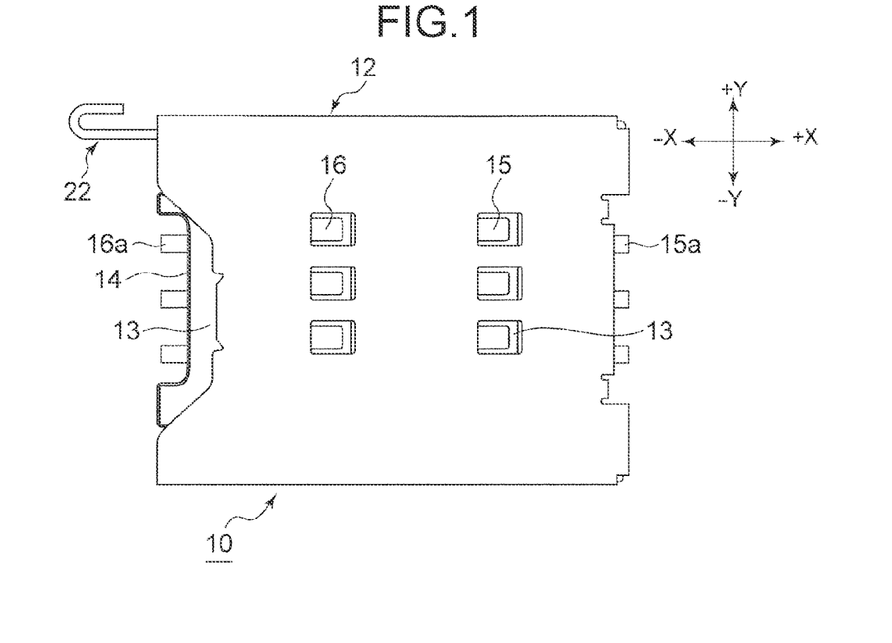
FIG. 1 is a top view schematically showing an example of a card connector according to a first embodiment of the present invention.
Figure 2:
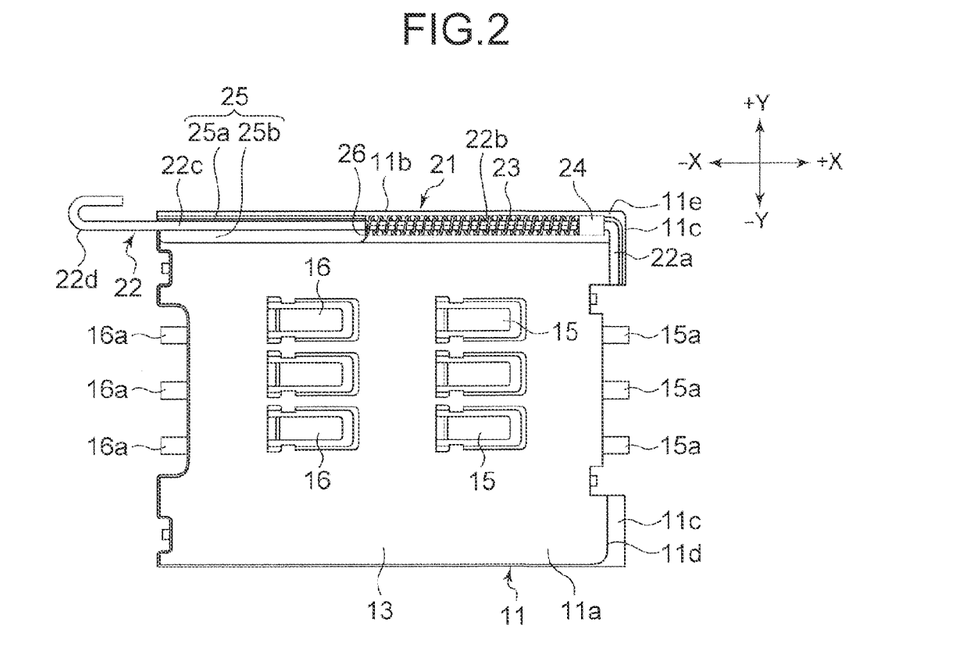
FIG. 2 is a top view of a base member, with a cover member of the card connector shown in FIG. 1 removed.
Figure 3:
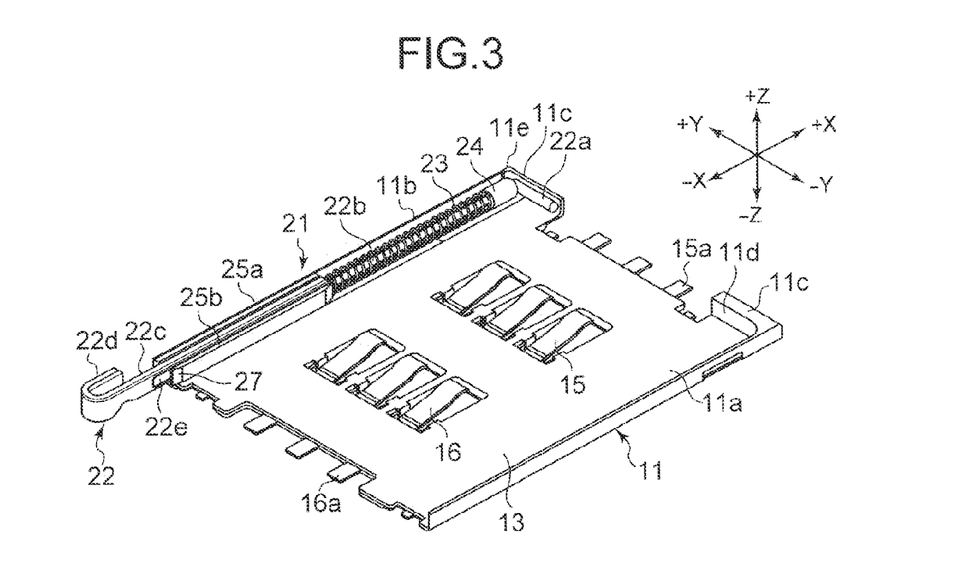
FIG. 3 is a perspective view showing the base member shown in FIG. 2 when seen obliquely from rear.

A card connector of a first embodiment of the present invention will be described with reference to the accompanying drawings. FIGS. 1 to 3 are figures showing an example of the connector of the present embodiment. As shown in FIGS. 1 to 3 and other figures, the card connector 10 of the present embodiment is substantially in the shape of a flat rectangular parallelepiped. The card connector 10 is configured of a base member 11, which is a main body of the connector, and a cover member 12, which is combined with the base member. In this case, the cover member 12 is assembled on the base member 11, defining a card accommodating space 13. Incidentally, the base member 11 is for example made of an insulating synthetic resin material, which is for example excellent in workability. The cover member 12 is for example made of a flat elastic metallic material such as a sheet metal cover made of stainless steel or the like.

A rear end of the card accommodating space 13 is open as a card insertion port 14. An IC card, such as a SIM card, is for example placed in or removed from the card accommodating space 13 through the card insertion port 14. For example, a first contact line 15, which includes a plurality of elastic contact arms (three in the case of the figure) that come in contact with contact pads provided in a front end portion of the card so that pressure is applied to the contact pads, is provided ahead of the card accommodating space 13 in such a way that the first contact line 15 is insert molded into, or pressed into, a bottom wall 11a of the base member 11. The first contact line 15, for example, extends outside from a front wall of the base member 11 as a first connection terminal portion 15a, which is electrically connected to an external terminal of a to-be-mounted electronics device of the card connector 10.

Similarly, a second contact line 16, which includes a plurality of elastic contact arms (three in the case of the figure) that come in contact with contact pads of a rear end portion of the card so that pressure is applied to the contact pads, are provided behind the card accommodating space 13 in such a way that the second contact line 16 is insert molded into, or pressed into, the bottom wall 11a of the base member 11. The second contact line 16 extends out of the base member 11 from an area around the card insertion port 14 as a second connection terminal portion 16a. Incidentally, the arrangement of contacts of the above components may take various kinds of configurations in accordance with electronics devices.

An ejection mechanism 21 is provided on, for example, a left wall 11b of the base member 11 to help eject a card. The ejection mechanism 21 includes a metallic ejection lever 22, e.g., in a rod shape, which is used to eject a card from the card accommodating space 13; a compression coil spring 23, which pushes and helps the ejection lever 22 move forward (the card insertion direction); and a tubular coil stopper 24, which keeps the compression coil spring 23 on the ejection lever 22. In this case, the metallic material of the ejection lever is preferably of stainless steel, aluminum, alloy or the like, to have a mechanical strength and be easy to be processed.

The ejection mechanism 21 also includes a pair of guide walls 25 (25a and 25b), which are fixed and attached to the bottom wall 11a of the base member 11. A pair of the guide walls 25 configures a guide member that controls the motion of the ejection lever 22 in the forward and backward directions.

The metallic ejection lever 22 includes an arm portion 22a, which, for example, has an L-shaped rear end portion that comes in contact with the front end portion of the card to pull the card; a coil mounting portion 22b, which is inserted into the compression coil spring 23; a slide portion 22c; and a pull portion 22d. In this case, a guide front end portion 26 of the guide wall 25 serves as a stopper during a pulling operation of the ejection lever 22. The compression coil spring 23 elastically expands and contracts between the tubular coil stopper 24, which is attached to a tip of the ejection lever 22, and the guide rear end portion 26. The compression coil spring 23 continuously pushes the ejection lever 22 forward in the card accommodating space 13.

The arm portion 22a of the ejection lever 22 comes in contact with a rear end portion of a to-be-mounted IC card to move the card from a mounting location to the rear, enabling the card to be easily pulled out of the card connector 10. Accordingly, the arm portion 22a is so provided as to make substantially a right angle with the card insertion/withdrawal direction at the rear end of the ejection lever 22, as well as to extend in the card accommodating space 13. As shown in FIG. 2, when the arm portion 22a is at an original location where the arm portion 22a is in contact with the front wall 11c of the base member 11, the arm portion 22a is so positioned as not to project deeper into the card accommodating space 13 than an inner wall surface 11d of the front wall 11c. The arm portion 22a keeps the tubular coil stopper 24, along with the compression coil spring 23, from sliding out or dropping off from the ejection lever 22. Incidentally, the arm portion is formed and bent to be inclined from the card insertion/withdrawal direction in accordance with the shape of an adopted card. If a card, such as a micro SD card, has an inclined plane, a contact portion is preferably bent at an angle suitable for the inclination. The tubular coil stopper 24 may be in the shape of a triangle or the like in accordance with a card inclination plane.

As described above, on the coil mounting portion 22b, the compression coil spring 23, which pushes the ejection lever 22, is mounted. The coil mounting portion 22b is, for example, processed into a required shape, such as a cylinder, cylindroid or rectangular column, so that the compression coil spring 23 can elastically expand and contract.

The slide portion 22c of the ejection lever 22 is led to a pair of guide walls 25, which are described later in detail. The slide portion 22c is a portion that makes the ejection lever 22 move smoothly in the forward and backward directions. In this case, as shown in FIG. 3, for example, a convex portion 22e is so provided as to extend along a one-side surface of the slide portion 22c that is in the shape of a long and thin rectangular parallelepiped. It is desirable that the convex portion 22e slide and fit into a concave portion 27, which is formed on an inner surface of one of a pair of guide walls 25, or guide wall 25b, from a front end portion thereof to a rear end portion. Thanks to the sliding and fitting of the convex portion 22e, the ejection lever 22 slides in the forward and backward directions of the card connector 10, keeping the ejection lever 22 from moving out of the guide walls 25 in the upward direction.

The pull portion 22d serves, for example, as a to-be-grabbed portion at a time when the mounted card is pulled out of the card connector 10. Therefore, even if the ejection lever 22, along with the card connector 10, is made smaller, the pull portion 22d is formed into a structure having a certain degree of size so that the operability of the ejection lever does not decrease. Incidentally, several structural examples of the pull portion 22d will be described later with reference to FIG. 6.

The tubular coil stopper 24 prevents the compression coil spring 23 from moving out from the coil mounting portion 22b of the ejection lever 22. Incidentally, the compression coil spring 23 could easily come out due to the elastic expansion and contraction of the compression coil spring 23 at a time when the ejection lever 22, along with the card, is pulled out of the card accommodating space 13. In the ejection mechanism 21, the front end portion of the tubular coil stopper 24 comes in contact with a side-wall projecting portion 11e of a front end of the left wall 11b of the base member 11 at a time when the arm portion 22a of the ejection lever 22 is at an original location where the arm portion 22a is in contact with the front wall 11c of the base member 11. The tubular coil stopper 24 may be made of metal or, for example, non-metal such as resin.

A pair of guide walls 25 is provided so as to be fixed to the bottom wall 11a of the base member 11 in such a way that the guide walls 25 run parallel to the left wall 11b of the base member 11 on the base member 11. In this case, in order to make it possible to lead the ejection lever 22 smoothly, a pair of guide walls 25a and 25b is so provided that the distance therebetween is substantially the same as the width of the slide portion 22c. Incidentally, it is preferred that a pair of guide walls 25 be formed integrally with the base member 11 in a resin molding process.

Figure 4:
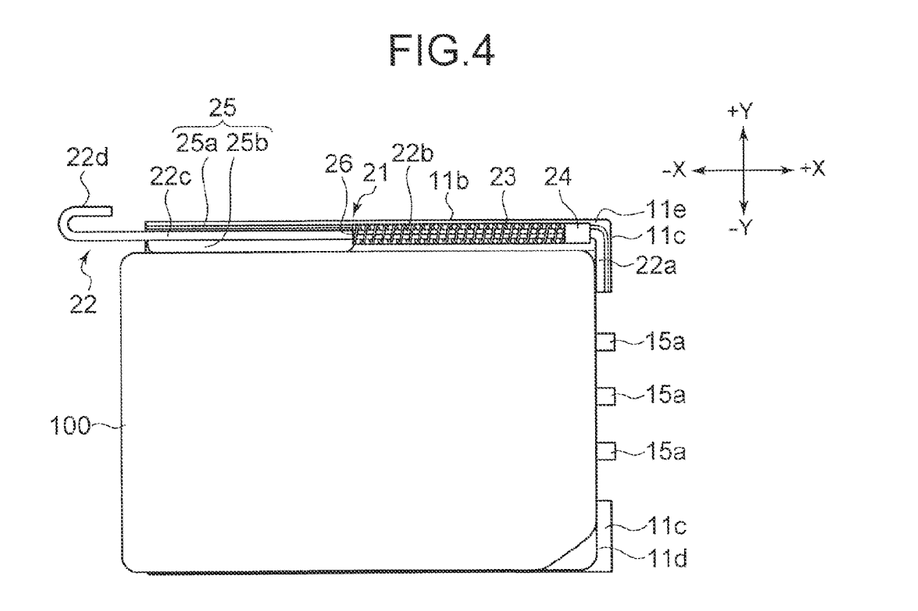
FIG. 4 is a top view of the card connector of the first embodiment of the present invention on which an IC card is mounted, with the cover member removed.

The following describes an operation of the card connector 10 of the present embodiment with reference to FIGS. 1 to 3 and FIG. 4. FIG. 4 is a top view of the card connector 10 on which an IC card 100 is mounted, with the cover member removed.

As shown in FIG. 4, when the IC card 100, such as Micro SD card, is for example mounted, the IC card 100 is housed in the card accommodating space 13 shown in FIG. 1. The contact pads of the IC card 100 come in contact with the first contact line 15 and the second contact line 16 so that pressure is applied thereon.

The insertion of the IC card into the card connector 10 takes place in the following manner. The rear end portion of the IC card is manually pushed and inserted from the card insertion port 14. When the card is inserted, the ejection lever 22 of the ejection mechanism 21 is positioned at the original location. As the IC card 100 is manually inserted until the front end portion of the IC card 100 comes in contact with the inner wall surface 11d of the front wall 11c of the base member 11, the IC card 100 is accommodated in the card accommodating space 13. Then, the mounting process comes to an end.

When the IC card 100 is removed from the card connector 10, the rear end of the pull portion 22d of the ejection mechanism 21, which always extends out of the rear end of the base member 11, is grabbed and pulled backward. At this time, the IC card 100 is also pulled backward out of the card accommodating space 13 because the arm portion 22a of the ejection lever 22 is in contact with the front end portion of the IC card 100. In this case, the slide portion 22c of the ejection lever 22 is led to the guide walls 25 before sliding and being pulled backward. After the ejection lever 22 is pulled out to a predetermined location, the rear end of the IC card 100 is grabbed and pulled backward. As a result, the IC card 100 is removed from the connector 10. After the card is removed, the ejection lever 22 automatically moves back to the original location due to the action of the compression coil spring 23.

In the removing process of the IC card 100, a certain amount of force is required to pull the pull portion 22d of the ejection lever 22 so as to overcome the elastic pushing force of the compression coil spring 23. However, after the IC card 100 is pulled out, the ejection mechanism 21 automatically moves back to the original location. Therefore, a process of returning the ejection lever 22 can be omitted. Since the ejection lever 22 always comes back to the original location, it is possible to prevent the ejection lever 22 from projecting from the card insertion port 14 of the connector for a long time. Moreover, since the pull portion 22d does not get caught or encounter other unexpected accidents, the ejection lever 22 is not damaged; the card connector 10 or an electronics device is not physically damaged.

Figure 5A:
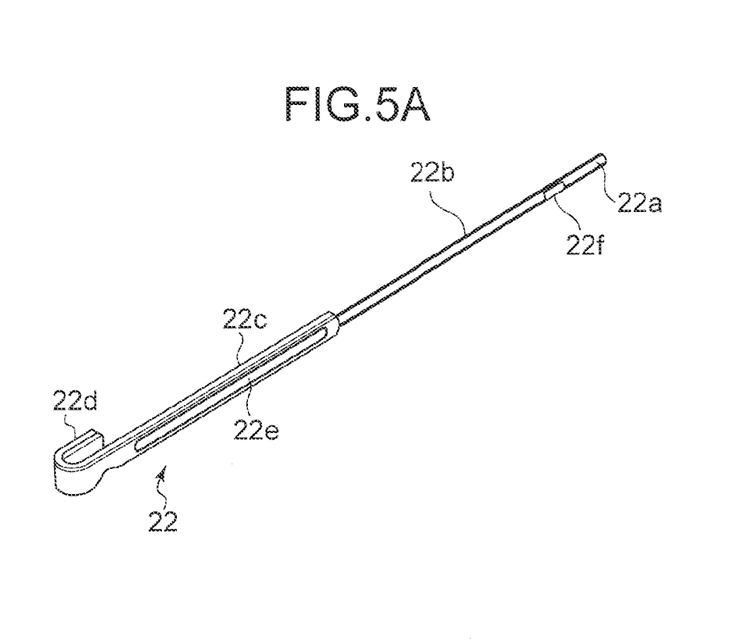
FIG. 5A is and FIG. 5B are perspective views, which are used in explaining how an ejection lever, used for an ejection mechanism of the card connector, are created and attached in the case of the card connector of the embodiment of the present invention.
Figure 5B:
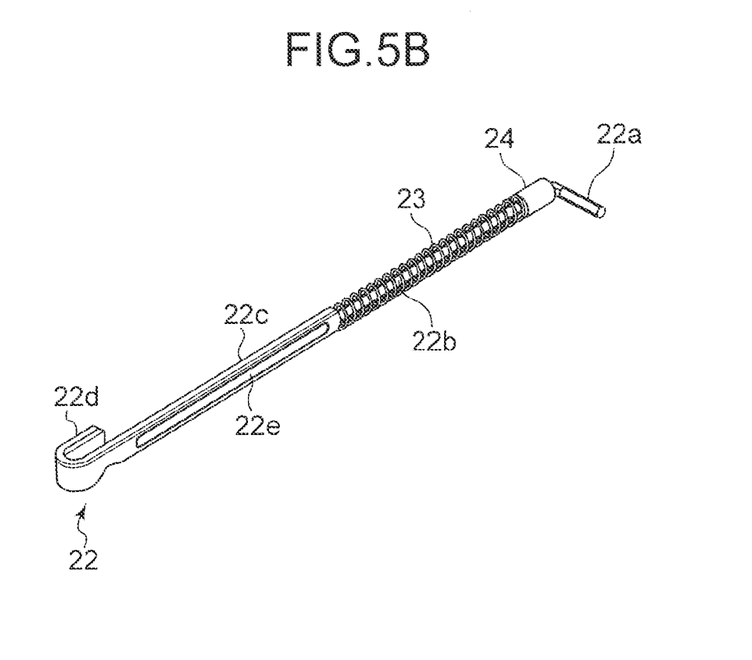

The following describes how the above ejection lever 22 is produced and attached to the ejection mechanism 21 with reference to FIG. 5A, FIG. 5B and FIG. 3. FIGS. 5A and 5B are a perspective view respectively, which is used in explaining how the ejection lever, used for the ejection mechanism, is created and attached in the case of the card connector of the present embodiment.

First, for example, a thin metallic plate, such as stainless steel, with a thickness of approximately 0.5 mm is pressed into long, thin metallic pieces with the use of blank punching: the metallic pieces are, for example, 1 mm in width and about 20 mm in length, which match the forward/backward length of the card connector 10. Then, thanks to subsequent metallic processing, the long, thin metallic pieces are processed and molded into materials. As shown in FIG. 5A, regions, which turn into the arm portion 22a and the coil mounting portion 22b, go through a plastic forming process before being formed into a required shape such as a rectangular column. Then at the front end thereof, a notch 22f is formed. On a one-side surface of the metallic piece, which turns into the slide portion 22c, a convex portion 22e is formed thanks to press working such as embossing. A front end of the metallic piece is formed into the pull portion 22d thanks to, for example, deep drawing.

Then, the linear ejection lever 22, which is obtained after the metallic piece is processed and molded, is attached to the ejection mechanism 21 shown in FIG. 3. In this case, the linear ejection lever 22 is inserted between the paired guide walls 25 from the rear end portion thereof so that the convex portion 22e of the slide portion 22c slides and fits into the concave portion 27 of the guide walls 25.

After the insertion is stopped halfway, as shown in FIG. 5B, the compression coil spring 23 is mounted on the coil mounting portion 22b. The tubular coil stopper 24 is then attached. After that, the tip of the ejection lever 22 is bent at about a right angle at the notch 22f. In this manner, the ejection lever 22, which has the arm portion 22a and is pushed into the card accommodating space 13 of the card connector 10, is attached to the guide walls 25, and the ejection mechanism 21 is built.

The following describes an example of the configuration of the pull portion 22d of the ejection lever 22 with reference to FIG. 6. FIG. 6 is a partially enlarged perspective view showing an example of the configuration of an ejection lever pull portion used for the ejection mechanism of the present embodiment.

As described above, the pull portion 22d serves as a to-be-grabbed portion at a time when the mounted card is pulled out of the card connector 10. Therefore, even if the ejection lever 22 is made smaller, the pull portion 22d preferably has a certain degree of size so that the operability of the ejection lever 22 does not decrease. The structure thereof may be the one shown in FIGS. 5A and 5B, or one of those shown in FIGS. 6A to 6C.

Figure 6A:
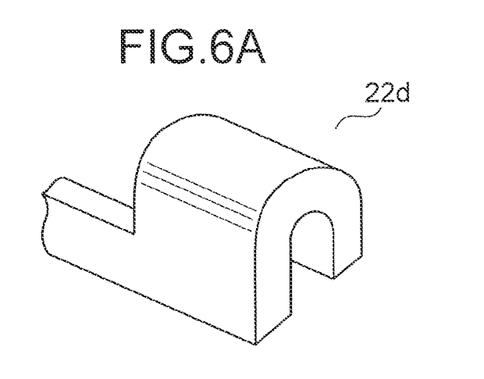
FIG. 6A, FIG. 6B and FIG. 6C are partially enlarged perspective views showing an example of the configuration of an ejection lever's pull portion used for the ejection mechanism of the embodiment of the present invention.
Figure 6B:
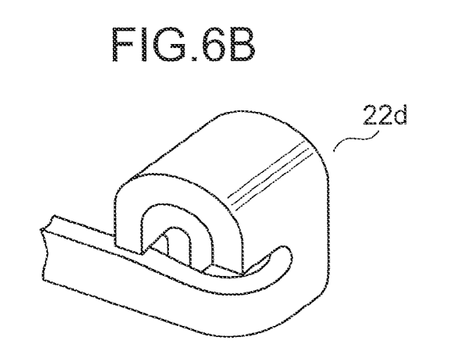

The structure shown in FIG. 6A is pressed so as to have a wider rear end in a blank punching process of the above long, thin metallic piece. The rear end thereof is bent so as to form a shape almost close to a dome. The structure shown in FIG. 6B is formed by combining the following processes: a deep drawing process of a metallic piece that has been pressed so as to get the wider rear end, and the bending process. The above structure is a structure formed integrally with the ejection lever 22.

Figure 6C:
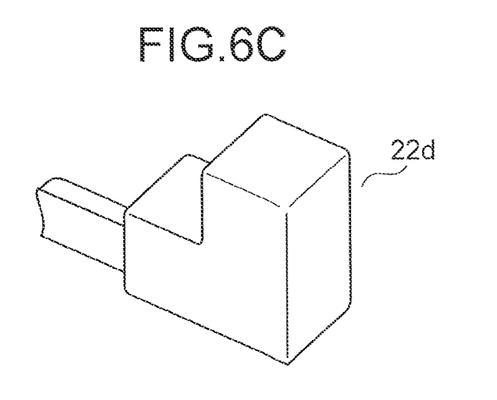

Meanwhile, for example, a resin handle of the pull portion 22d shown in FIG. 6C is attached to a rear end portion of the ejection lever 22. In this case, when compared with those shown in FIGS. 6a and 6b, the pull portion 22d is easy to grab and can be made larger in an unrestricted manner. Therefore, the structure is suitable for making the card connector 10 smaller. In this case, it is desirable that the handle of the pull portion 22d be made of organic polymer, such as thermosetting or thermoplastic plastics. The reason is that the organic polymer is excellent in workability and can be easily processed into a desired shape. Incidentally, other various structures may be used for the pull portion 22d.

According to the present embodiment, an integral-structure metallic ejection lever is incorporated into the ejection mechanism of the card connector. The ejection lever includes the following portions, which are formed and molded from the front end of the ejection lever to the rear end: an arm portion, which is bent at nearly a right angle relative to the card insertion/withdrawal direction; a coil mounting portion; a slide portion; and an pull portion. In this case, the coil mounting portion is inserted into a compression coil spring. A tubular coil stopper is placed between the compression coil spring and the arm portion to prevent the coil spring from sliding out. The guide walls of the ejection mechanism help the slide portion move in the card insertion/withdrawal direction; the operation section is formed into a structure that prevents the grabbing operability from declining.

Therefore, the ejection mechanism of the connector has a simple structure. It is also possible to make the ejection lever, around which the compression coil spring is put, thinner while maintaining the strength thereof in the ejection mechanism. It becomes easier to make the guide walls, which configure a guide member, smaller and thinner. As it becomes easier to have a smaller ejection mechanism and a lower back thereof, it becomes also possible to make the connector, which includes the ejection mechanism, even smaller and thinner. Since the pull portion of the ejection lever can be made larger, it is easy to carry out an operation of manually inserting the card even if the connector is made smaller and thinner. In this manner, it is possible to eliminate conventional limits to smaller and thinner card connectors.

Moreover, according to the ejection mechanism of the present embodiment, the components thereof decrease in number; the ejection lever thereof can be made from one metallic piece in a metal working process. Therefore, it is easy to lower the costs of connectors having the ejection mechanism.

(Second Embodiment)

Hereinafter, a card connector of a second embodiment of the present invention will be described with reference to the accompanying drawings. The following describes chiefly the differences between the first and second embodiments.

Figure 7:
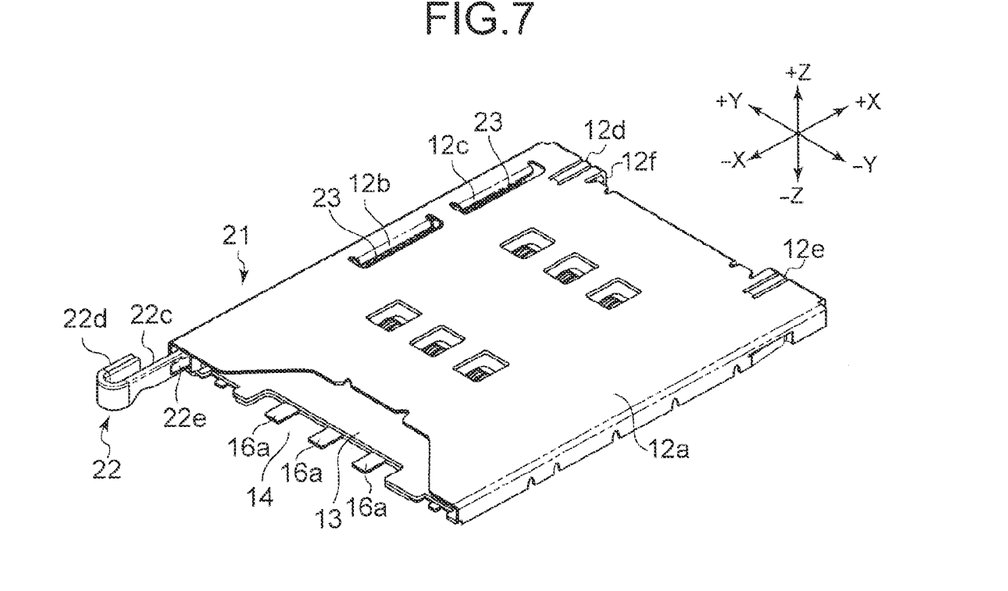
FIG. 7 is a perspective view showing an example of a card connector according to a second embodiment of the present invention.
Figure 8:
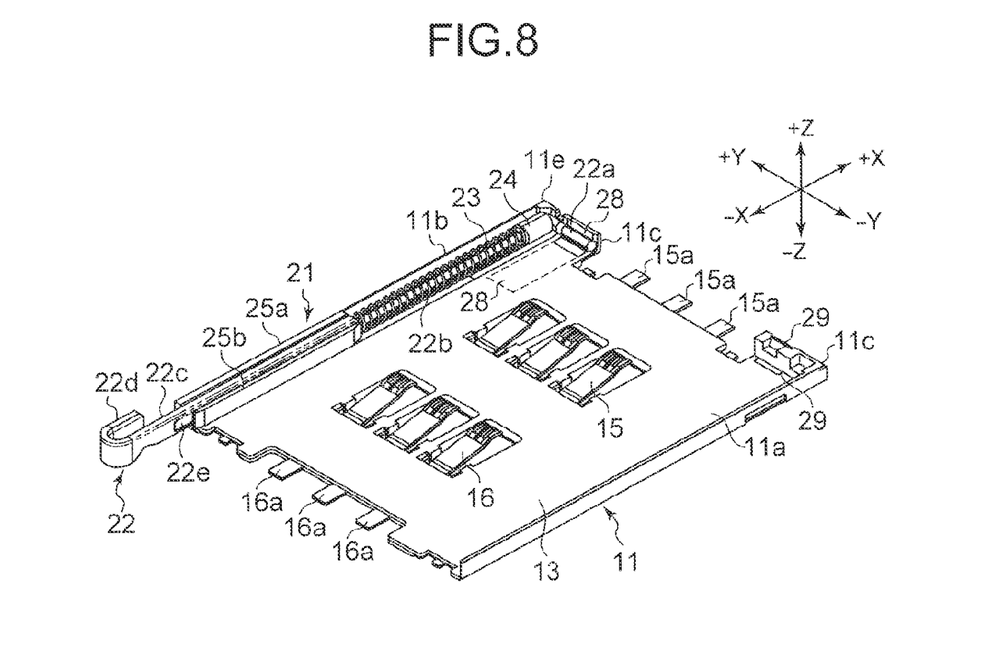
FIG. 8 is a perspective view of a base member, with a cover member of the card connector shown in FIG. 7 removed.
Figure 9:
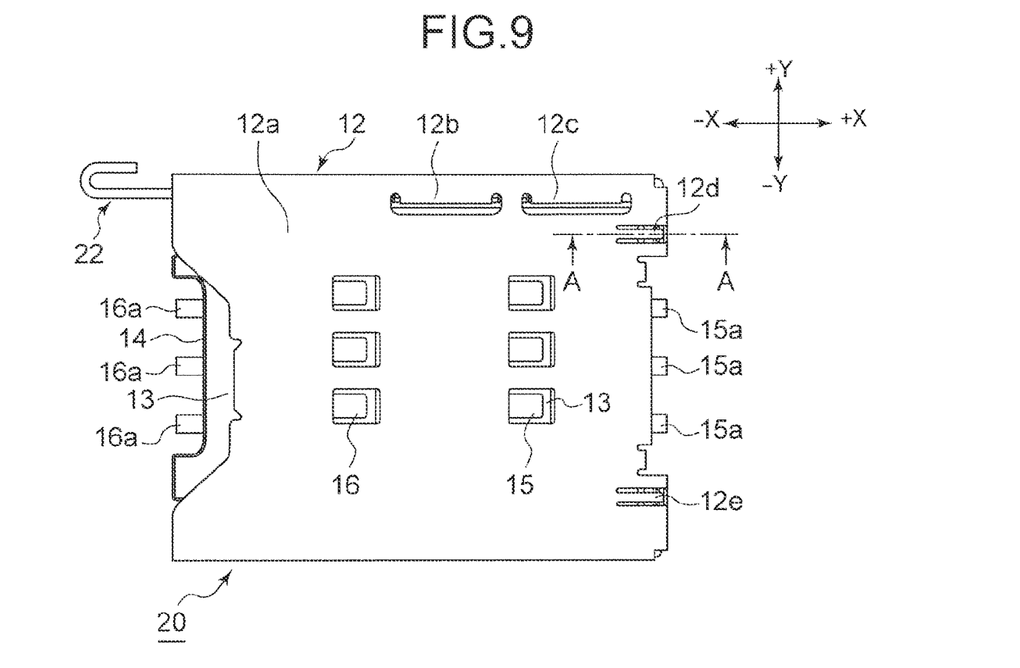
FIG. 9 is a top view of the card connector shown in FIG. 7.

As shown in FIGS. 7 to 9, in a card connector 20 of the present embodiment, a card accommodating space 13 is formed after a base member 11 and a cover member 12 are assembled. An IC card is placed in or removed from the card accommodating space 13. An ejection mechanism 21 provided on a left wall 11b of the base member 11 is formed so as to have a structure in which a slide portion 22c of an ejection lever 22 is led between paired guide walls 25a and 25b having no concave portion 27 as described in the first embodiment. Bent pieces 12b and 12c, which are bent at substantially a right angle from an upper wall 12a, are attached to the upper wall 12a of the cover member 12.

In this case, the bent pieces 12b and 12c are formed by, for example, punching out a portion of the cover member 12, which is a sheet metal cover, and bending the portion. The bent pieces 12b and 12c prevent a compression coil spring 23 from getting into the card accommodating space 13. The bent pieces 12b and 12c also come in contact with the compression coil spring 23, prevent the deformation of the spring or the like, and make possible the smooth elastic expansion and contraction of the compression coil spring 23. Therefore, the bent pieces 12b and 12c give the ejection lever less play, which occurs as the ejection lever 22 moves in the forward and backward directions.

Reinforcing metallic pieces 28 and 29 of conductor plates are attached to a portion of the front of a bottom wall 11a of the base member 11 and the left and right inner wall surfaces of a front wall 11c. Incidentally, the reinforcing metallic piece 28 is so designed as to be electrically connected to an arm portion 22a of the ejection lever 22 at a time when the ejection lever 22 has returned to the original location thanks to the elastic pushing force of the compression coil spring 23, as described in the first embodiment.

On a front end of the upper wall 12a of the cover member 12, pressing pieces 12d and 12e, which are punched-out metallic strips, are formed. The pressing pieces 12d and 12e come in contact with the reinforcing metallic pieces 28 and 29 elastically. The reinforcing metallic pieces 28 and 29 pass through the cover member 12, which is to be electrically connected, before being connected to a ground line of a circuit board of an electronics device. In this manner, the reinforcing metallic pieces 28 and 29 are grounded.

The reinforcing metallic pieces 28 and 29 are designed to reinforce the base member 11 made of resin. In particular, the reinforcing metallic pieces 28 and 29 are quite effective in preventing the deformation of the base member 11 at a time when the first contact line 15 or second contact line 16, described in the first embodiment, is embedded in the base member 11.

Figure 10:
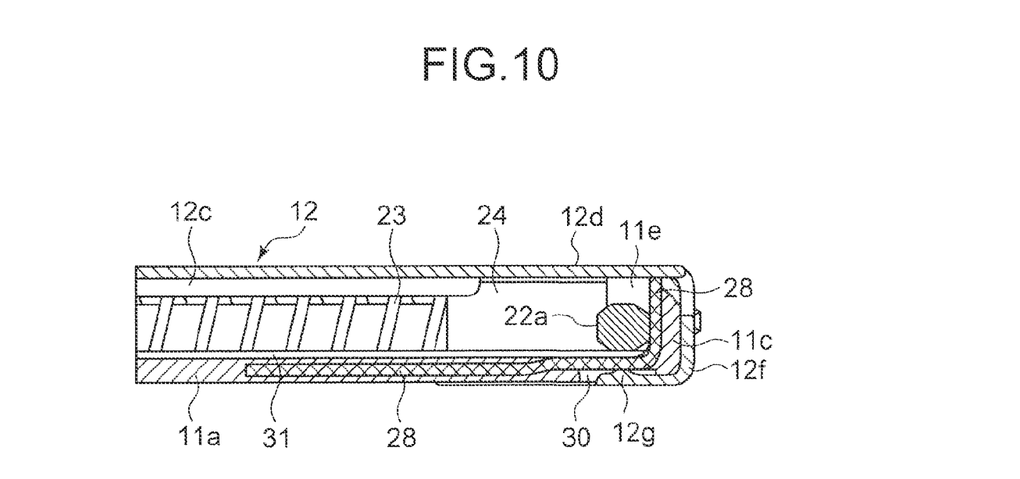
FIG. 10 is an enlarged cross-sectional view of the card connector shown in FIG. 9 taken in the direction of arrow A-A.

The following provides a more detailed description of how the ejection lever 22 is electrically connected to the cover member 12 and how the ejection lever 22 is grounded. As shown in FIG. 10, when the ejection lever 22 is positioned at the original location thanks to the elastic pushing force of the compression coil spring 23, the arm portion 22a thereof comes in contact with the reinforcing metallic piece 28, which is a conductor plate, and is electrically connected to the reinforcing metallic piece 28. In this case, for example, the arm portion 22a is formed in the shape of a polygonal column (octagonal column in the figure); it is preferred that one side of the polygonal column be in contact with a surface of the reinforcing metallic piece 28.

A predetermined length of the reinforcing metallic piece 28 is planted into the bottom wall 11a of the base member 11 made of resin. The reinforcing metallic piece 28 is exposed to a surface from a partial region of the front of the bottom wall 11a and bent upward at a right angle before being attached to the inner wall surface of the front wall 11c of the base member 11. The upper end of the bent reinforcing metallic piece 28 comes in contact elastically thanks to the pressing piece 12d, which is a portion of the cover member 12. Accordingly, the ejection lever 22 passes through the reinforcing metallic piece 28 and the cover member 12, which are to be electrically connected, before being connected to a ground line of a circuit board of an electronics device. In this manner, the ejection lever 22 is grounded.

Moreover, a left-side cover front wall 12f of the cover member 12 shown in FIG. 7 is bent at a right angle in a lower area thereof and extend backward as shown in FIG. 10. A cover projecting portion 12g, which is a portion of the cover member 12, is electrically connected to the lower end of the reinforcing metallic piece 28 in an opening 30 provided at the front end of the bottom wall 11a. In this manner, the pressing piece 12d is placed above the reinforcing metallic piece 28 and the cover projecting portion 12g below the reinforcing metallic piece 28, so that the reinforcing metallic piece 28 is held between the pressing piece 12d and the cover projecting portion 12g, which are made of a flat spring metallic material and face each other.

Thus, the reinforcing metallic piece 28 and the cover member 12 continue to be electrically connected in a more stable manner. In this case, it is preferred that the cover member 12, the ejection lever 22 and the reinforcing metallic piece 28 be made of a metallic material that is excellent in oxidative resistance or a conductive material. When the oxidative-resistance material is used, it is possible to prevent changes over years of the state of a surface thereof due to oxidization, as well as to guarantee a long-term electrical connection of the ejection lever 22 with the cover member 12 via the reinforcing metallic piece 28. In this case, for the reinforcing metallic piece 28, the following metallic materials, which keep conductivity even after being oxidized, may be effective: ruthenium, iridium or the like. Alternatively, the arm portion 22a and a surface of the reinforcing metallic piece 28 may be plated with gold, platinum or the like.

After the card connector 20 is mounted on an electronics device, a soldering piece (not shown) provided at a lower end of the cover member 12 is, for example, soldered to a circuit wiring on a circuit board and grounded. In this manner, the ejection lever 22 passes through the reinforcing metallic piece 28, which is electrically connected to the arm portion 22a thereof, and then the cover member 12 via the cover front wall 12f or cover projecting portion 12g before being connected to a ground line of a circuit board of an electronics device.

As shown in FIG. 10, the compression coil spring 23, which pushes the arm portion 22a of the ejection lever 22 as well as the tubular coil stopper 24, is in contact elastically thanks to the bent piece 12c. Moreover, on the bottom wall 11a of the base member 11, a step portion 31 is formed so as to separate an accommodating region for the compression coil spring 23 and tubular coil stopper 24 as a partition from the card accommodating space 13. The step portion is so formed to rise from the bottom wall 11a; a space between the edge of the coil spring pressing piece 12c of the cover member 12 and the bottom wall 11a is smaller than the diameter of the compression coil spring 23. If there is no step portion 31, a space is created between the arm portion 22a of the ejection lever 22 and the bottom wall 11a inside card accommodating space, causing the tip of the arm portion 22a to go down diagonally. Therefore, the step portion 31 prevents the tip of the arm portion 22a from rubbing the bottom wall 11a.

Even though not shown in the figure, the reinforcing metallic piece 29, which reinforces the base member 11, is attached to the right side of the base member 11 in a similar way to the reinforcing metallic piece 28 illustrated in FIG. 10. As in the case of the reinforcing metallic piece 28 described above, the reinforcing metallic piece 29 is held between the pressing piece 12e and a right-side cover projecting portion, which are made of a flat spring metallic material and face each other. Because of such a structure, the base member 11 and the cover member 12 are firmly combined together.

The following describes the operation and advantageous effects of the card connector 20 of the second embodiment. As described in the first embodiment with reference to FIG. 4, the insertion of the IC card into the card connector 20 takes place in the following manner. The rear end portion of the IC card is manually pushed and inserted from the card insertion port 14. In this case, the ejection lever 22 of the ejection mechanism 21 is at the original location, and the arm portion 22a thereof is electrically connected to the reinforcing metallic piece 28. The card is manually inserted until the front end portion of the card comes in contact with the inner wall surface of the front wall 11c of the base member 11. Thus, the card is housed in the card accommodating space 13 shown in FIG. 7 and mounted on the connector 20; the contact pads provided on the back surface of the card come in contact with the first and second contact lines 15 and 16 in such a way that pressure is applied thereto.

In a process of removing the mounted IC card from the card connector 20, the rear end of the pull portion 22d of the ejection mechanism 21 is grabbed and pulled backward, as in the case of the first embodiment. At this time, the arm portion 22a of the ejection lever 22 is in contact with the front end portion of the card. As the ejection lever 22 moves backward, the card is also pulled backward out of the card accommodating space 13. When the ejection lever 22 moves backward, the guide walls 25 lead the slide portion 22c thereof smoothly. After the ejection lever 22 is pulled to a predetermined position, the pull portion 22d thereof is released, and the rear end of the card is grabbed and taken out of the connector 20. After the pull portion 22d is released, the ejection lever 22 automatically moves back to the original location with the help of the pushing force of the compression coil spring 23; the arm portion 22a thereof is electrically connected to the reinforcing piece 28.

The operation of the above card connector 20 leads to the same advantageous effects as in the case of the card connector 10 described in the first embodiment. Moreover, in the case of the card connector 20, it is possible to easily prevent the IC card from being electrically damaged from, for example, a charged potential of a human body (human electrification voltage). The following provides additional details of the above advantageous effects.

A human body can be substantially regarded as a conductor. Static electricity is induced as people put on and off clothes, or as friction or the like occurs between shoes and floors when people are walking. As static electricity is induced, human electrification voltage (Vo) emerges: the human electrification voltage could be, for example, negative in the range of several hundred to ten-thousand bolts. When electrostatically-charged people grab the pull portion 22d of the ejection lever 22 to remove the above card, overcurrent emerges on the first contact line 15 and the contact pads, which come in contact with the first contact line 15 and the like in a way that applies pressure thereto, if the ejection lever 22 is not grounded. The overcurrent could break the IC inside the card and cause other electrical damages.

Here, when the capacitance of a human body relative to the earth is represented by Co, and the capacitance between the arm portion 22a and the above contact pads by $C_1$, an amount of electricity Q, with which the capacitance $C_1$ is charged, is substantially represented as follows: $Q1=\{Co \times C_1/(Co+C_1)\} \times Vo$. Thanks to the above overcurrent, the amount of electricity Q is supplied.

If the above human electrification voltage is too high, electricity is discharged, for example, between the above arm portion 22a and the contact pads. In this case, the creeping discharge of the IC card could lead to a significant decrease in the insulating performance of the card or to electrical damages, such as insulation breakdown.

When the ejection lever 22 is grounded as in the case of the second embodiment, static electricity is discharged from an electrostatically-charged person through, for example, the cover member 12 at a time when the electrostatically-charged person grabs the pull portion 22d of the ejection lever 22 to remove the card, thereby preventing the above electrical damages to the card. The above electrical damages to the card are likely to occur as the card is made smaller. Therefore, the card connector 20 of the second embodiment is effective in making the card even smaller.

Incidentally, if an insulating handle made of resin is attached to the pull portion 22d of the above ejection lever 22 as described in the first embodiment, the above electrical damages to the card are reduced. The reason is that the capacitance of the handle and the above $C_1$ are connected in series, leading to a decrease in the capacitance of an equivalent circuit thereof and a drop in the amount of charging electricity thereof. Alternatively, the capacitance of the handle is smaller than the above $C_1$. It is easy to increase the insulating resistance of the handle. It is possible to allow almost all of human electrification voltage Vo to be applied to the handle. Therefore, it becomes possible to easily prevent the above insulation breakdown.

As described above, in the card connector 20 of the second embodiment, when the ejection lever 22 of the ejection mechanism 21 is positioned at the original position, all that is required is for the arm portion 22a thereof to be electrically connected to the reinforcing metallic piece 28. Therefore, besides the above, the reinforcing metallic piece 28 can take any kind of structure as long as the reinforcing metallic piece 28 is electrically connected to the arm portion 22a at a time when the reinforcing metallic piece 28 is positioned at the front-end side of the card accommodating space 13 and when the ejection lever 22 is at the original location. The reinforcing metallic piece 28 may have a structure by which the reinforcing metallic piece 28 is electrically connected to either the pressing piece 12d of the cover member 12 or the cover projecting portion 12g. Alternatively, the reinforcing metallic piece 28 may have a structure by which another portion of the cover member 12 is electrically connected to the reinforcing metallic piece 28.

When the above reinforcing metallic piece 28 is used, the ejection lever 22 is formed in the following manner: the ejection lever 22 is electrically connected to the cover member 12 as the ejection lever 22 comes to the original location, whereas the ejection lever 22 is detached from the cover member 12 as a subsequent process of taking out the IC card takes place. In general, the card is electrically damaged by an electrostatically charged human body as the pull portion 22d of the ejection lever 22 is grabbed at the original location. Therefore, the above structure is enough to prevent electrical damages to the cards.

Moreover, for example, the following structure may be used to enable the ejection lever 22 to be electrically connected to the cover member 12 at all times even when the ejection lever 22 is not positioned at the original location. The compression coil spring 23, which allows the ejection lever 22 to be electrically connected to the cover member 12, and the tubular coil stopper 24 are made of a conductive material. The compression coil spring 23 is electrically connected to the cover member 12 via the bent pieces 12b and 12c.

Alternatively, a lever pressing piece (not shown) provided on the upper wall of the cover member 12 may be designed to come in contact with the slide portion 22c of the ejection lever 22 elastically. In this case, the ejection lever 22 is electrically connected to the cover member 12 through the lever pressing piece. Here, the lever pressing piece is formed by punching out a portion of the cover member 12, which is for example a sheet metal cover, and includes a spring member, which extends downward from the upper wall of the cover member 12 and which is in the shape of a tongue piece.

If the ejection lever 22 is electrically connected to the cover member 12 at all times, it is possible to prevent electrical damages to the card, for example, even when an unexpected occurrence of electric field induces static electricity on the ejection lever 22, besides the electrical damages to the IC card caused by a electrostatically-charged human body. It is also possible to prevent electrical damages to the card that are attributable to static electrification caused by, for example, the sliding and contacting of the card.

Incidentally, according to the second embodiment, the cover member 12 is grounded by, for example, soldering. However, even if the cover member 12 is not grounded and is electrically floating, electrical damages to the IC card are reduced. In this case, the following structure is employed: the ejection lever 22 is electrically connected to the cover member 12 having a relatively large capacitance relative to the earth. Static electricity, which is induced on the above ejection lever 22, is also capacitance-distributed to the cover member 12, and the distributed electricity is removed.

Moreover, according to the present embodiment, the convex portion 22e, which is formed along the one-side surface of the slide portion 22c of the ejection lever 22, may not exist. The convex portion 22e makes smaller a contact area between one guide member 25b and the slide portion 22c, enabling the ejection lever 22 to slide smoothly in the forward and backward directions. If a material or structure is used that makes the friction between the slide portion 22c and the guide member 25b small, the above convex portion 22e is not necessarily required.

According to the second embodiment, it is possible to achieve similar advantageous effects to those described in the first embodiment. Moreover, in this case, it is easy to protect the IC card, which is mounted on the connector, against the electrical damages associated with static electrification. Such electrical damages increase significantly as the card is made smaller. Therefore, the card connector of the present embodiment is extremely effective in making the card even smaller and thinner.

The above has described preferred embodiments of the present invention. The above embodiments are not intended to limit the present invention. Various modifications and variations in the embodiments detailed can be made by those of ordinary skill in the art without departing from the spirit and scope of the present invention.

For example, the ejection mechanism 21 of the card connector may be provided on a right wall of the base member 11.

Moreover, in the ejection mechanism 21, the guide wall 25a, one of the paired guide walls 25, may also serve as the left wall 11b of the base member 11.

The arm portion 22a of the ejection lever 22 may come in contact with a predetermined region between the front and rear ends of the card, not the front end of the IC card, so that the card is pulled out of the card connector. In this case, in line with the shape of the card, the arm portion 22a may be so formed as to make substantially right angles at, for example, the following two locations relative to the card insertion/withdrawal direction and to extend into the card accommodating space 13: the front end of the ejection lever 22, and another portion that lies behind the front end.

What is claimed is:

1. A card connector, comprising:
   a base member having an insertion port of an IC card, the IC card inserted from the insertion port in a card insertion/withdrawal direction, and defining a card accommodating space for housing the IC card, a cover member assembled on the base member, and a plurality of contacts arranged on the base member to be electrically connected to the IC card accommodated in the card accommodating space;
   the card connector comprising an ejection mechanism including a metallic ejection lever, a compression coil spring keeping the metallic ejection lever in the card accommodating space, and a guide member leading the metallic ejection lever in the card insertion/withdrawal direction, the ejection mechanism being used to pull the IC card accommodated in the card accommodating space out of the card accommodating space, and
   the metallic ejection lever including an arm portion inclined from the card insertion/withdrawal direction for coming in contact with the IC card, a coil mounting portion on which the compression coil spring is mounted, a slide portion sliding in the guide member, and a pull portion extending outside the base member,
   wherein, on the coil mounting portion of the ejection lever, a tubular coil stopper is mounted between the arm portion and the mounted compression coil spring in order to stop the compression coil spring from sliding out of the arm portion.

2. The card connector according to claim 1, wherein the guide member includes a pair of guide walls extending along a side wall of the base member in the card insertion/withdrawal direction, and that the slide portion of the ejection lever fits slidably into the pair of guide walls.

3. The card connector according to claim 2, wherein a handle made of an insulating material is fixed to a tip of the pull portion of the metallic ejection lever.

4. A card connector, comprising:
   a base member having an insertion port of an IC card, the IC card inserted from the insertion port in a card insertion/withdrawal direction, and defining a card accommodating space for housing the IC card, a cover member assembled on the base member, and a plurality of contacts arranged on the base member to be electrically connected to the IC card accommodated in the card accommodating space;
   the card connector comprising an ejection mechanism including a metallic ejection lever, a compression coil spring keeping the metallic ejection lever in the card accommodating space, and a guide member leading the metallic ejection lever in the card insertion/withdrawal direction, the ejection mechanism being used to pull the IC card accommodated in the card accommodating space out of the card accommodating space, and
   the metallic ejection lever including an arm portion inclined from the card insertion/withdrawal direction for coming in contact with the IC card, a coil mounting portion on which the compression coil spring is mounted, a slide portion sliding in the guide member, and a pull portion extending outside the base member, and
   the ejection lever being configured to enable electrical connection to the cover member,
   wherein on the coil mounting portion of the ejection lever, a tubular coil stopper is mounted between the arm portion and the mounted compression coil spring in order to keep the compression coil spring from sliding out of the arm portion.

5. The card connector according to claim 4, wherein the arm portion of the ejection lever is electrically connected to a conductor plate attached to a front-end side of the card accommodating space, and the conductor plate comes in contact with the cover member elastically.

6. The card connector according to claim 5, wherein the base member is made of insulating synthetic resin; and the conductor plate is embedded in a bottom wall of the base member, with a portion thereof being bent upward and attached to an inner wall surface of a front wall of the base member, and is made from a reinforcing metallic piece that reinforces the base member.

7. The card connector according to claim 6, wherein the arm portion of the ejection lever comes in contact with the conductor plate as the arm portion reaches the front-end side of the accommodating space.

8. The card connector according to claim 6, wherein the conductor plate is fixed integrally with the cover member and held between a pressing piece positioned above the conductor plate and a projecting portion below the conductor plate facing with each other.

9. The card connector according to claim 4, wherein the guide member includes a pair of guide walls extending along a side wall of the base member in the card insertion/withdrawal direction, and that the slide portion of the ejection lever fits slidably into the pair of guide walls.

10. The card connector according to claim 9, wherein a handle made of an insulating material is fixed to a tip of the pull portion of the metallic ejection lever.

11. The card connector according to claim 1, wherein the coil mounting portion is inside the compression coil spring.

12. The card connector according to claim 11, wherein the inclination of the arm portion keeps the compression coil spring and the tubular coil stopper from sliding off of the arm portion.

13. The card connector according to claim 4, wherein the coil mounting portion is inside the compression coil spring.

14. The card connector according to claim 13, wherein the inclination of the arm portion keeps the compression coil spring and the tubular coil stopper from sliding off of the arm portion.

* * * * *